United States Patent [19]

Taylor

[11] 4,015,484
[45] Apr. 5, 1977

[54] GUIDE PULLEY FOR WIDE BELTS

[76] Inventor: Miller Taylor, c/o Taylor Tobacco Enterprises Inc., Highway 701 South, Elizabethtown, N.C. 28337

[22] Filed: Feb. 20, 1976

[21] Appl. No.: 659,879

[52] U.S. Cl. .................................. 74/230.3; 74/240
[51] Int. Cl.² ...................... F16H 55/36; F16H 7/18
[58] Field of Search ............ 74/230.3, 230.01, 240; 198/137, 184, 127, 192

[56] References Cited

UNITED STATES PATENTS 3,217,554  11/1965  Stalker ............................. 74/230.3

Primary Examiner—Leonard H. Gerin
Attorney, Agent, or Firm—Sughrue, Rothwell, Mion, Zinn & Macpeak

[57] ABSTRACT

A guide pulley for wide belts is comprised of two smooth cylindrical cylinders secured to or journaled on a shaft in spaced relation and a grooved pulley freely journaled on the shaft intermediate the two cylinders for the reception of a guide rib integral with and extending longitudinally of a wide belt intermediate the edges thereof disposed in engagement with the two cylinders.

4 Claims, 2 Drawing Figures

GUIDE PULLEY FOR WIDE BELTS

BACKGROUND OF THE INVENTION

1. Field of the Invention

The present invention is directed to a guide pulley for wide belts adapted to prevent the shifting of the belt in a direction transverse to its direction of travel on the pulley.

2. Prior Art

It is old and well known in the art to provide an elongated cylindrical guide roll or pulley for a wide flat belt. However, during the running of such belts they frequently tend to shift laterally on the guide roll or pulley transverse to the longitudinal direction of movement of the belt.

In order to prevent such shifting it is also known in the art to provide a central longitudinal rib on the side of the belt which engages the guide roll or pulley and to provide the guide roll or pulley with a circumferential groove for the reception of the rib. However, even with such an arrangement the guide rib has been known to ride up out of the groove thereby allowing the belt to shift laterally relative to the guide roll or pulley. Such lateral shifting causes the belt to extend beyond the end of the pulley and rub against stationary parts of the machinery. Such rubbing adversely affects the speed of the belt and leads to the distruction of the edges of the belt.

SUMMARY OF THE INVENTION

The guide pulley for wide belts according to the present invention provides an arrangement which will positively prevent the lateral shifting of a wide belt relative to the guide pulley in a simple, efficient and economical manner without adversely affecting the operation of the belt.

The guide pullley for wide belts according to the present invention is comprised of a pair of elongated cylindrical members which may be secured on or rotatably journaled on a shaft in spaced apart relation and a grooved pulley freely rotatable on the shaft intermediate the cylindrical members for the reception of a guide rib on the face of the belt adapted to engage the cylindrical members.

DETAILED DESCRIPTION OF THE INVENTION

Figure 1:
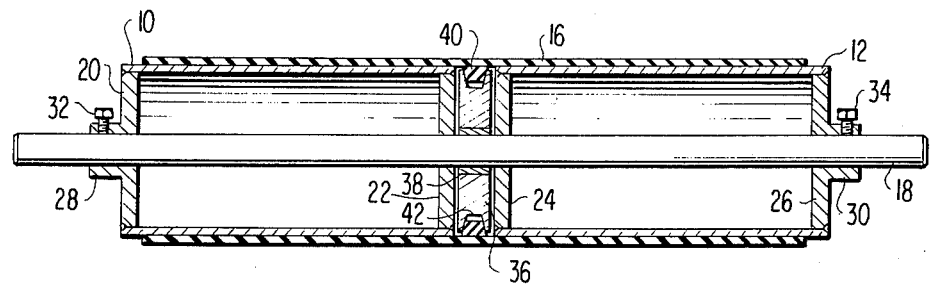
FIG. 1 is a partial longitudinal sectional view of a first embodiment of the guide pulley for a wide belt according to the present invention.

The guide pulley according to the present invention is comprised of two cylindrical sleeves 10 and 12 which are adapted to support a flat wide belt 16. In the embodiment of FIG. 1 the cylindrical members 10 and 12 are comprised of hollow cylindrical sleeves which are supported on the shaft 18 by means of apertured webs 20, 22, 24 and 26 which may be welded to the sleeves or secured thereto by any other suitable means. The webs 20 and 26 are provided with cylindrical flanges 28 and 30 respectively through which bolt 32 and 24 are threaded to secure the cylindrical members to the shaft 18 in spaced apart relation.

The grooved pulley 36 is disposed on the shaft 18 intermediate the cylindrical members 10 and 12. The pulley 36 is free rotatable relative to the shaft 18 and suitable anti-friction means 38 such as a Teflon sleeve or the like may be provided to reduce the friction between the pulley and the shaft.

The belt 16 is provided with a rib 40 which extends longitudinally of the belt on the surface thereof adapted to engage the cylindrical members 10 and 12 intermediate the edges thereof. The rib 40 may be of integral one piece construction with the belt 16 or may be separate member secured to the belt 16 by any suitable means such as vulcanizing, adhesives or the like. The rib 40 and the groove 42 in the pulley 36 have a complimentary configuration.

In operation the composite guide pulley for the wide belt 16 as shown in FIG. 1 may be a drive member for the belt 16 or may be an idle supporting pulley. Thus the shaft 18 may be secured to any suitable means for imparting rotation thereto or may be simply journaled in suitable stationary bearings. The pulley as illustrated in FIG. 1 can either be an end pulley or an intermediate pulley for an endless belt and the provision of the rib 40 in engagement with the groove pulley 36 will prevent the belt 16 from shifting in a direction parallel to the axis of the shaft 18 during longitudinal movement of the belt. While a complimentary V-shaped configuration for the rib 40 and groove 42 has been shown in the drawing it is obvious that other complimentary configurations can be utilized.

Figure 2:
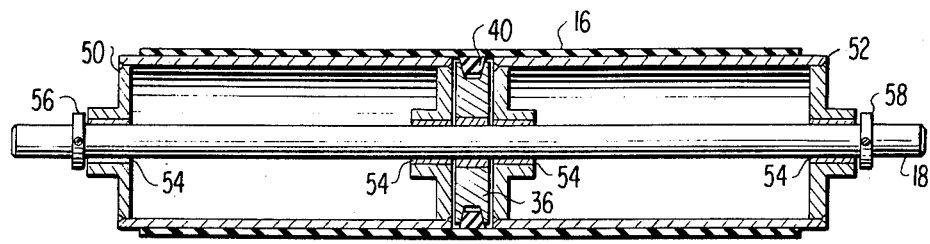
FIG. 2 is a partial sectional view of a second embodiment of the guide pulley for a wide belt according to the present invention.

In the embodiment of FIG. 2 the cylindrical pulley members 50 and 52 are journaled for rotation relative to the shaft 18 upon suitable bearing members 54. A pair of restraining collars 56 and 58 are secured to the shaft 18 by set screws to locate the cylindrical pulley members 50 and 52 and the intermediate groove pulley 36 on the shaft 18. In this embodiment the shaft 18 would be fixed in suitable support and the composite guide pulley arrangement for the belt 16 would be a idle support pulley.

It is obvious that the exact configuration of the cylindrical pulley members 50 and 52 could vary widely within the scope of the present invention. For example, the cylindrical pulley members could be of any desired material and could be solid cylinders rather than hollow cylinders as illustrated. Likewise the cylindrical portions could be of integral one piece construction with the shaft with the intermediate groove pulley being freely located for rotation within a suitable central annular recess. By having the grooved pulley freely rotatable with respect to the two cylindrical pulleys the rib 40 disposed in engagement with the groove pulley will function to prevent lateral shifting of the belt 16 relative to its direction of travel.

While the invention has been particularly shown and described with reference to preferred embodiments thereof it will be understood by those in the art that the foregoing and other changes in form and detail may be made therein without departing from the spirit and scope of the invention.

What is claimed is:

1. A composite pulley for a wide flat belt having a longitudinally disposed central rib on one surface thereof comprising a pair of coaxial spaced apart cylindrical pulley portions adapted to support the wide belt on opposite sides of the central rib and grooved pulley means coaxially disposed intermediate and freely rotatable relative to said cylindrical pulley portions adapted to receive and guide said central rib.

2. A composite pulley as set forth in claim 1 further comprising shaft means, said cylindrical pulley portions being secured to said shaft means for rotation therewith and said grooved pulley means being freely rotatable on said shaft means.

3. A composite pulley as set forth in claim 1 further comprising shaft means, said grooved pulley means and said cylindrical pulley portions being freely rotatable relative to each other and said shaft means.

4. A composite pulley as set forth in claim 1 wherein said grooved pulley means is provided with an annular V-shaped groove adapted to mate with a V-shaped rib on the belt.

* * * * *